(12) United States Patent
Huang et al.

(10) Patent No.: US 8,051,319 B2
(45) Date of Patent: Nov. 1, 2011

(54) METHOD FOR POWER MANAGEMENT FOR COMPUTER SYSTEM

(75) Inventors: Wen-Juin Huang, Taipei County (TW); Chin-Han Chang, Taipei County (TW); Liang-Cheng Mai, Taipei County (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 586 days.

(21) Appl. No.: 12/275,412

(22) Filed: Nov. 21, 2008

(65) Prior Publication Data

US 2009/0254765 A1 Oct. 8, 2009

(30) Foreign Application Priority Data

Apr. 2, 2008 (TW) .............................. 97111970 A

(51) Int. Cl.
*G06F 1/26* (2006.01)
(52) U.S. Cl. ................ 713/340; 713/300; 713/310
(58) Field of Classification Search .................. 713/300, 713/310, 320, 340
See application file for complete search history.

(56) References Cited

U.S. PATENT DOCUMENTS 7,574,321 B2 * 8/2009 Kernahan et al. ............. 702/179
2001/0032321 A1 * 10/2001 Nanno et al. .................. 713/300

FOREIGN PATENT DOCUMENTS

CN 1622005 6/2005

OTHER PUBLICATIONS

English abstract of CN1622005, pub. Jun. 1, 2005.

* cited by examiner

*Primary Examiner* — Dennis M Butler
(74) *Attorney, Agent, or Firm* — Thomas|Kayden

(57) ABSTRACT

The invention provides a method for power management for a computer system. In one embodiment, the computer system comprises a system controller, a chipset, and a battery coupled to the chipset via a system management bus. First, a timer of the chipset is used to calculate an accumulated time value. When the accumulated time value exceeds a threshold value, the chipset is directed to send a system control interrupt to the system controller. After the system controller receives the system control interrupt, the system controller is triggered to detect a power level supplied by the battery via the system management bus.

20 Claims, 5 Drawing Sheets

METHOD FOR POWER MANAGEMENT FOR COMPUTER SYSTEM

CROSS REFERENCE TO RELATED APPLICATIONS

This Application claims priority of Taiwan Patent Application No. TW97111970, filed on Apr. 2, 2008, the entirety of which is incorporated by reference herein.

BACKGROUND OF THE INVENTION

1. Field of the Invention

The invention relates to computer systems, and more particularly to power management for computer systems.

2. Description of the Related Art

A computer system, such as a handheld device or a notebook, operates according to power supplied by batteries. Because a battery has a limited amount of power, a computer system cannot operate when the power of the battery is exhausted. The computer system therefore must know a power level of the battery. When the power level of the battery is lower than a threshold value, the computer system must remind a user of the reduced power level, thus directing the user to replace the battery with a new one.

Referring to FIG. 1, a block diagram of a conventional computer system 100 is shown. The computer system 100 comprises a system controller 102, such as CPU, a south bridge chipset 104, an embedded controller 106, a system management bus 110, a battery 108, and other device 112. The system controller 102 is a core of the computer system 100 and controls other component devices of the computer system 100. The embedded controller 106 is connected to the battery 108 and the other device 112 via the system management bus 110. The embedded controller 106 controls all devices connected to the system management bus 110 and reports a status of all devices connected to the system management bus 110 to the south bridge chipset 104. In one embodiment, the other device 112 is a fan or a keyboard.

When a power level of the battery 108 is reduced, the embedded controller 106 must reports reduction of the power level of the battery 108 to the system controller 102 via the south bridge chipset 104. Referring to FIG. 2, a flowchart of a method 200 for power management for the conventional computer system 100 is shown. The embedded controller 106 first detects whether a power level supplied by the battery 108 has decreased (step 202). If so, the embedded controller 106 triggers the south bridge chipset 104 to send a system control interrupt to the system controller 102 (step 204). In one embodiment, the embedded controller 106 enables a status bit of a general purpose register of the south bridge chipset 104, thus triggering the south bridge chipset 104 to send the system control interrupt to the system controller 102.

When the system controller 102 receives the system control interrupt corresponding to the embedded controller 106, the system controller 102 queries the embedded controller 106 about a status of the devices connected to the system management bus 110 to generate further instructions to the devices. In one embodiment, the system controller 102 executes an operating system code to check data stored in a register 120 of the embedded controller 106 (step 206). The system controller 102 then determines occurrence of an event about a power level of the battery 108 according to the data stored in the register 120 of the embedded controller 106 (step 208). The system controller 102 then executes a basic input/output system (BIOS) code to detect the power level supplied by the battery 108 (step 210). Finally, the system controller 102 executes an operating system code to update data about the power level of the battery 108 (step 212).

Although the computer system 100 timely updates data about a power level of the battery 108, the computer system 100 still has deficiencies. First, the computer system 100 has an embedded controller 106 for controlling the system management bus 110. Because the computer system 100 may be a handheld device with a small size, the embedded controller 106, which occupies a large area of a printed circuit board of the computer system 100, hinders size reduction of the computer system 100. In addition, a computer system 100 requiring the embedded controller 106 has a higher cost than one that does not require the embedded controller 106. A computer system without the aforementioned deficiencies is therefore required.

BRIEF SUMMARY OF THE INVENTION

The invention provides a method for power management for a computer system. In one embodiment, the computer system comprises a system controller, a chipset, and a battery coupled to the chipset via a system management bus. First, a timer of the chipset is used to calculate an accumulated time value. When the accumulated time value exceeds a threshold value, the chipset is directed to send a system control interrupt to the system controller. After the system controller receives the system control interrupt, the system controller is triggered to detect a power level supplied by the battery via the system management bus.

The invention provides a computer system. In one embodiment, the computer system comprises a battery, a chipset connected to the battery via a system management bus, and a system controller coupled to the chipset. The chipset calculates an accumulated time value with a timer thereof, and sends a system control interrupt to the system controller when the accumulated time value exceeds a threshold value. The system controller detects a power level supplied by the battery via the system management bus when the system controller receives the system control interrupt.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 3:
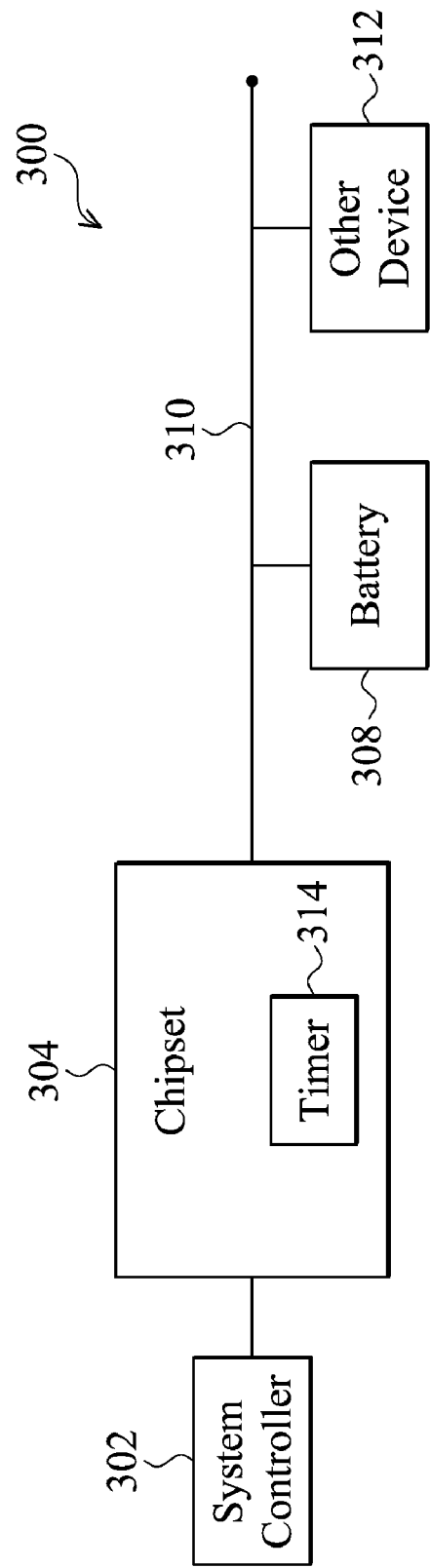
FIG. 3 is a block diagram of a computer system with a battery as a power supply according to the invention.

Referring to FIG. 3, a block diagram of a computer system 300 with a battery 308 as a power supply according to the invention is shown. The computer system 300 may be a handheld device or a notebook, for example. In one embodiment, the computer system 300 comprises a system controller 302, a chipset 304, a system management bus 310, the battery 308, and other device 312. The system controller 302 is a core of the computer system 300 and controls other component devices of the computer system 300. In one embodiment, the system controller 302 can be a central processor unit (CPU). The battery 308 provides power for operating all the component devices of the computer system 300. In one embodiment, the chipset 304 can be a south bridge chipset. The south bridge chipset 304 is connected to the battery 308 and the other device 312 via the system management bus 310. In one embodiment, a system-management-bus clock pin and a system-management-bus data pin of the south bridge chipset 304 are respectively coupled to a system-management-bus clock pin and a system-management-bus data pin of the battery 308 via the system management bus 310. In addition, the south bridge chipset 304 has a timer 314 capable of calculating an accumulated time value according to an elapsing time period. In another embodiment, the chipset 304 can be a combination of a north bridge chipset and a south bridge chipset. In one embodiment, the system controller 302 executes a basic input/output system (BIOS) code to detect a power level of the battery 308, and reports the power level of the battery 308 to an operating system.

Figure 4:
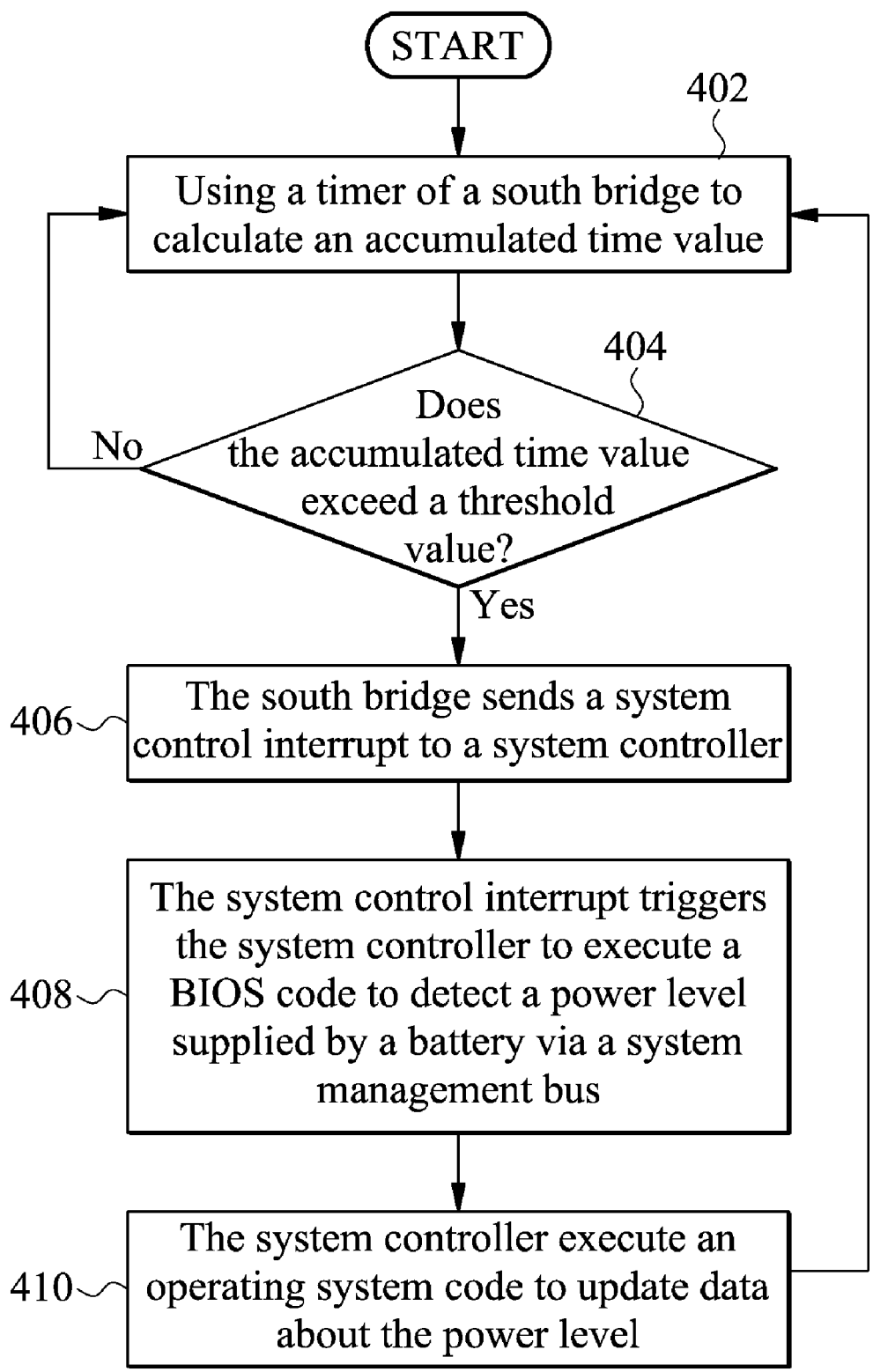
FIG. 4 is a flowchart of a method for power management for the computer system shown in FIG. 3 according to the invention.

Referring to FIG. 4, a flowchart of a method 400 for power management for the computer system 300 according to the invention is shown. The timer 314 of the south bridge chipset 304 first calculates an accumulated time value (step 402). When the accumulated time value calculated by the timer 314 exceeds a threshold value (step 404), the south bridge chipset 304 sends a system control interrupt to a system controller 302 (step 406), and the timer 314 then clears the accumulated time value to zero. In one embodiment, the threshold value is equal to a minute. Because the timer 314 calculates the accumulated time value to indicate an elapsing time period, the south bridge chipset 304 sends a system control interrupt to the system controller 302 whenever the elapsing time period is equal to the threshold value. In detail, the south bridge chipset 304 sends a system control interrupt to notice an operating system executed by the system controller 302.

When the system controller 302 receives a system control interrupt from the south bridge chipset 304, the system controller 302 detects a power level of the battery 308 via the system management bus 310 (step 408). In one embodiment, the system controller 302 executes a BIOS code to detect the power level supplied by the battery 308. When the system controller 302 has obtained the power level of the battery 308, the system controller 302 executes an operating system code to update data about the power level of the battery 308 (step 410). In one embodiment, the operating system code shows the power level of the battery 308 on a screen of the computer system 300 as a reference for a user of the computer system 300.

Figure 5:
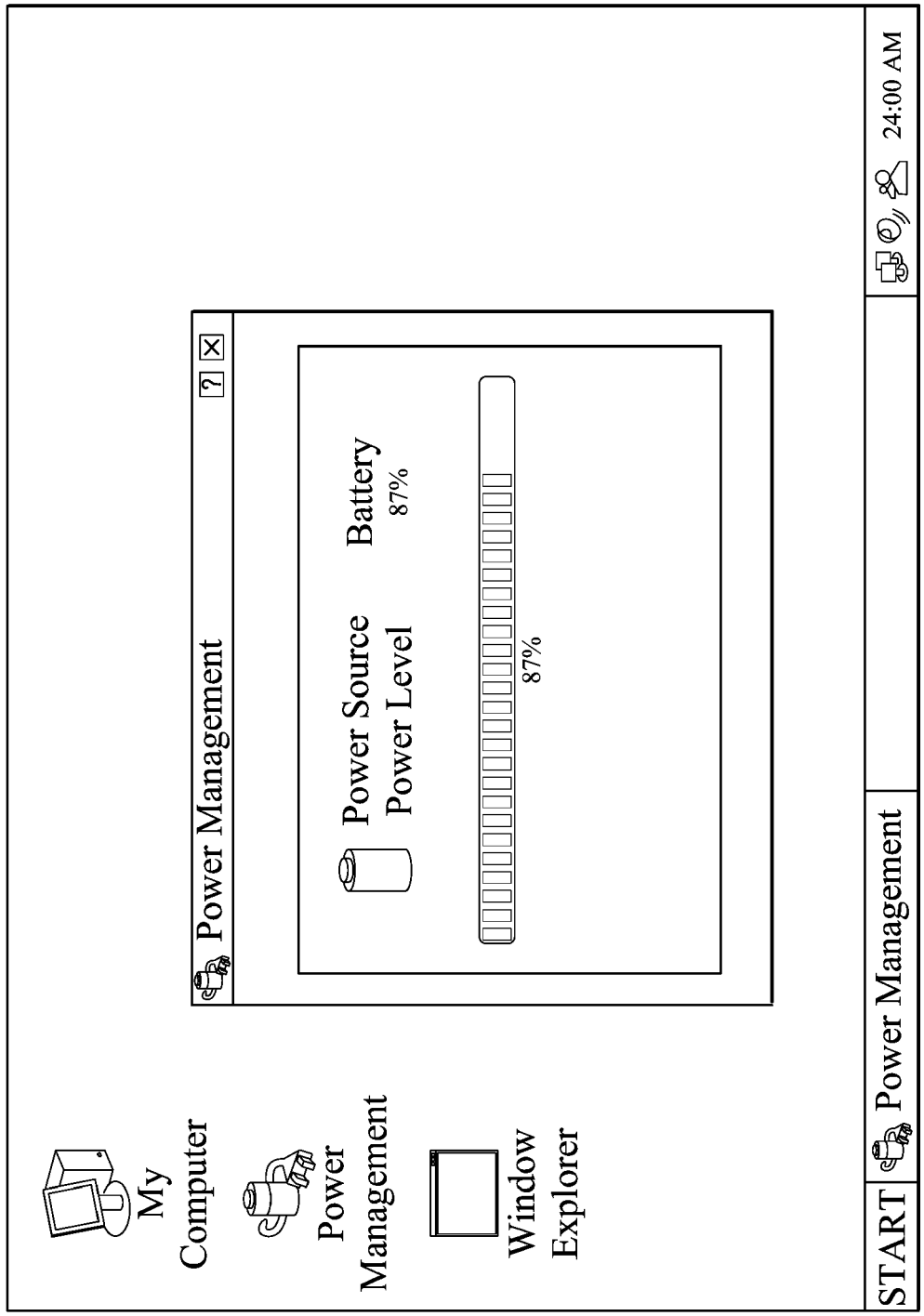
FIG. 5 is a schematic diagram of a screenshot of a screen showing a power level of a battery.

Referring to FIG. 5, a schematic diagram of a screenshot of the screen showing the power level of the battery 308 is shown. When a predetermined time interval has passed, the timer 314 triggers the south bridge chipset 304 to send a system control interrupt to the system controller 302, and then the system controller 302 updates the power level data shown on a screen of the computer system 300 according to the trigger of the system control interrupt. The user of the computer system 300 therefore always knows a power level status of the battery 308. The user can therefore timely replace the battery 308 when the power level of the battery 308 is reduced, and the computer system 300 is assured of sufficient power supply.

Figure 1:
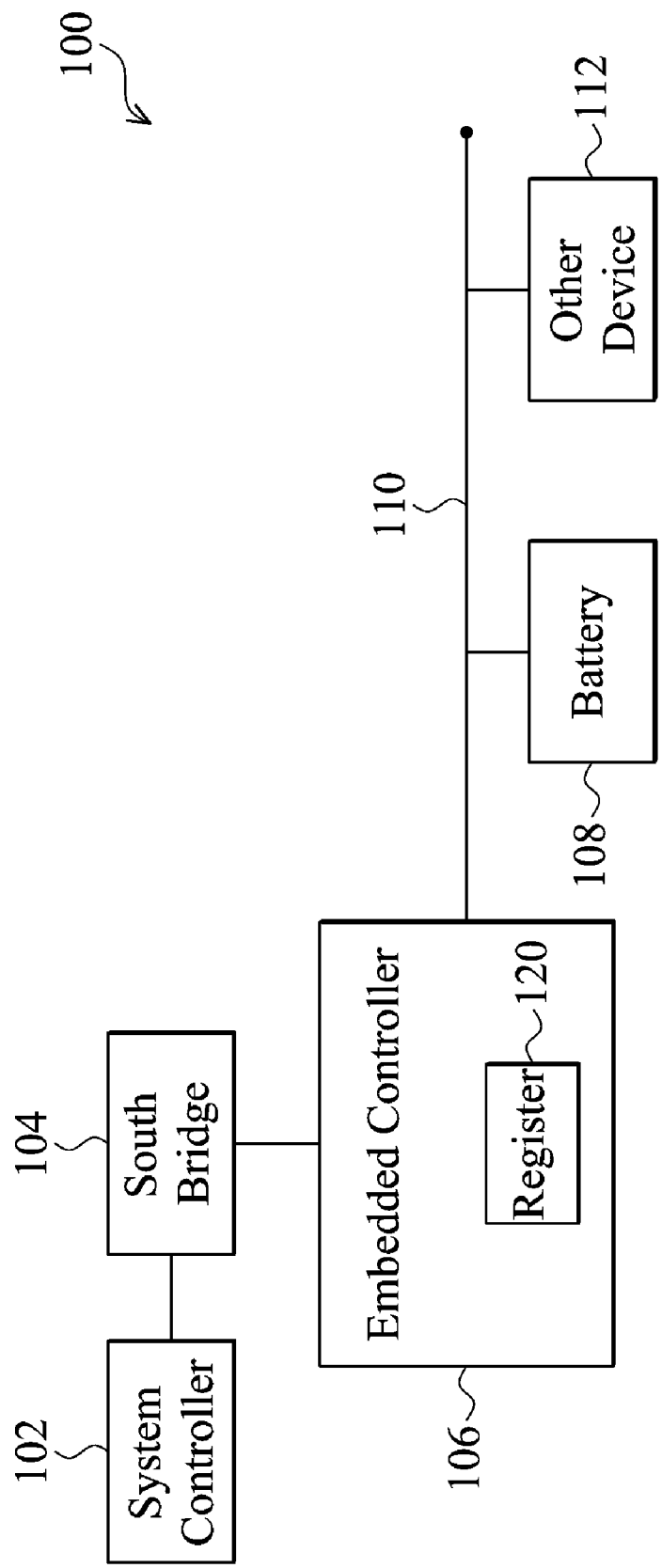
FIG. 1 is a block diagram of a conventional computer system.
Figure 2:
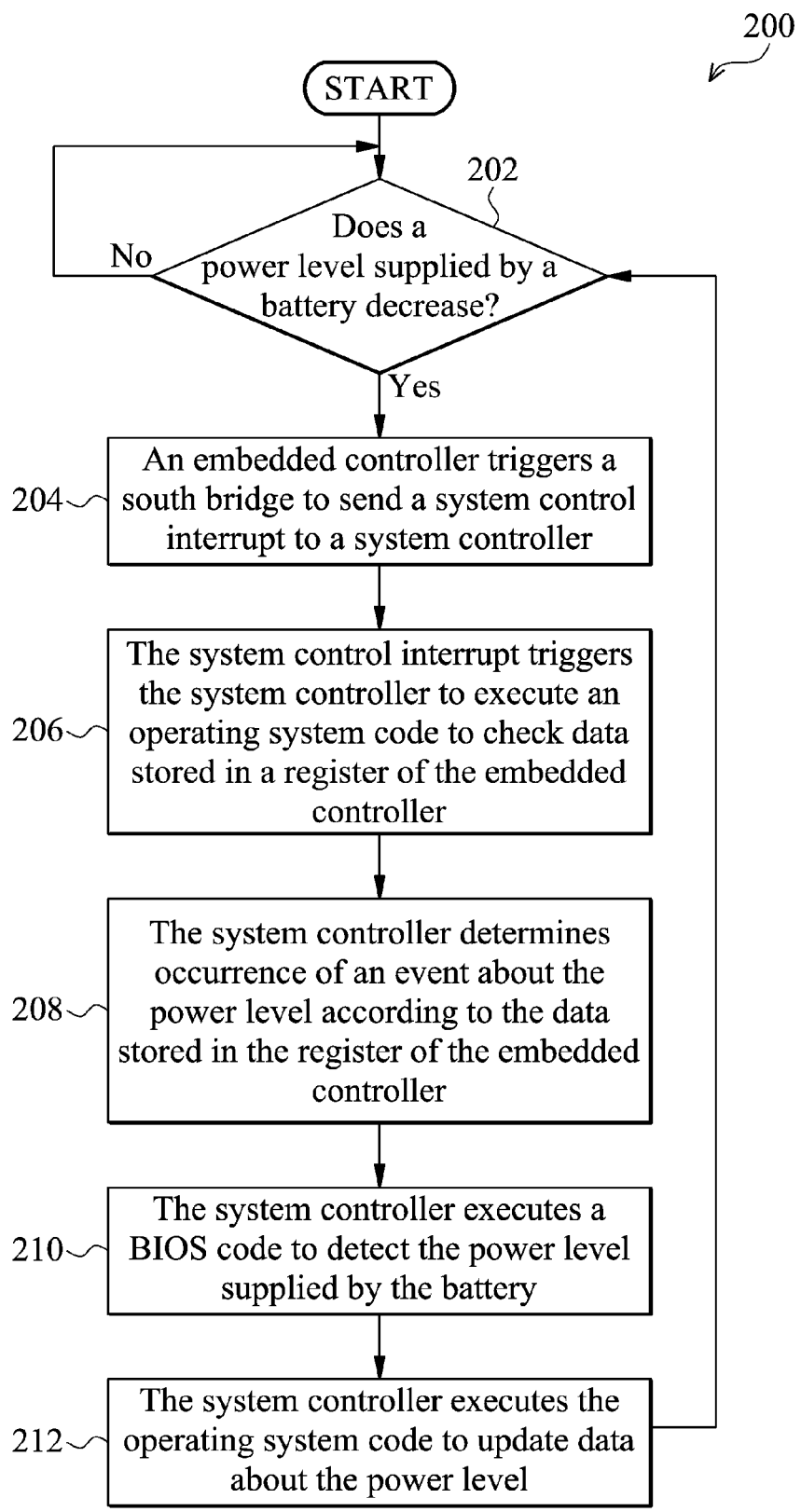
FIG. 2 is a flowchart of a method for power management for the conventional computer system shown in FIG. 1.

The computer system 300 is capable of providing real-time information about a power level supplied by a battery. Compared to the conventional computer system 100 shown in FIG. 1, the computer system 300 does not require an embedded controller 106, and hardware cost of the computer system 300 therefore is reduced. In addition, because an embedded controller 106 is removed from a printed circuit board of the computer system 300, the computer system 300 can reduce its size, which benefits further miniaturization of the computer system 300, such as a handheld device or a notebook. Furthermore, the system controller 302 detects a power level of the battery 308 via the system management bus 310 regularly. The computer system 300 is therefore superior to the conventional computer system 100.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for power management for a computer system, wherein the computer system comprises a system controller, a chipset, and a battery coupled to the chipset via a system management bus, comprising:

using a timer of the chipset to calculate an accumulated time value;

when the accumulated time value exceeds a threshold value, directing the chipset to send a system control interrupt to the system controller; and after the system controller receives the system control interrupt, triggering the system controller to detect a power level supplied by the battery via the system management bus.

2. The method as claimed in claim 1, wherein when the system controller receives the system control interrupt, the system controller executes a basic input/output system (BIOS) code to detect the power level of the battery.

3. The method as claimed in claim 1, wherein a system-management-bus clock pin and a system-management-bus data pin of the battery are respectively coupled to a system-management-bus clock pin and a system-management-bus data pin of the chipset.

4. The method as claimed in claim 1, wherein the method further comprises directing the system controller to execute an operating system code to update data about the power level supplied by the battery after the system controller detects the power level supplied by the battery.

5. The method as claimed in claim 4, wherein updating data about the power level comprises showing the power level on a screen of the computer system.

6. The method as claimed in claim 1, wherein when the accumulated time value of the timer exceeds the threshold value, the timer clears the accumulated time value to zero.

7. The method as claimed in claim 1, wherein the computer system is a notebook or a handheld device.

8. The method as claimed in claim 1, wherein the threshold value is a minute.

9. The method as claimed in claim 1, wherein the chipset is a south bridge chipset or a combination of a north bridge and a south bridge.

10. The method as claimed in claim 1, wherein the system controller is a central processor unit (CPU).

11. A computer system, comprising:
a battery;
a chipset, connected to the battery via a system management bus, calculating an accumulated time value with a timer thereof, and sending a system control interrupt to a system controller when the accumulated time value exceeds a threshold value; and
the system controller, coupled to the chipset, detecting a power level supplied by the battery via the system management bus after the system controller receives the system control interrupt.

12. The computer system as claimed in claim 11, wherein when the system controller receives the system control interrupt, the system controller executes a basic input/output system (BIOS) code to detect the power level of the battery.

13. The computer system as claimed in claim 11, wherein a system-management-bus clock pin and a system-management-bus data pin of the battery are respectively coupled to a system-management-bus clock pin and a system-management-bus data pin of the chipset.

14. The computer system as claimed in claim 11, wherein the system controller executes an operating system code to update data about the power level supplied by the battery after the system controller detects the power level supplied by the battery.

15. The computer system as claimed in claim 14, wherein the system controller executes an operating system code to show the power level on a screen of the computer system, thus updating data about the power level.

16. The computer system as claimed in claim 11, wherein when the accumulated time value of the timer exceeds the threshold value, the timer clears the accumulated time value to zero.

17. The computer system as claimed in claim 11, wherein the computer system is a notebook or a handheld device.

18. The computer system as claimed in claim 11, wherein the threshold value is a minute.

19. The computer system as claimed in claim 11, wherein the chipset is a south bridge chipset or a combination of a north bridge and a south bridge.

20. The computer system as claimed in claim 11, wherein the system controller is a central processor unit (CPU).

* * * * *